(12) United States Patent
Morgan et al.

(10) Patent No.: US 8,329,081 B2
(45) Date of Patent: Dec. 11, 2012

(54) METHOD OF CREATING A GOLF BALL WITH A SECONDARY SURFACE TEXTURE FEATURE

(75) Inventors: William E. Morgan, Barrington, RI (US); Nicholas M. Nardacci, Bristol, RI (US)

(73) Assignee: Acushnet Company, Fairhaven, MA (US)

( * ) Notice: Subject to any disclaimer, the term of this patent is extended or adjusted under 35 U.S.C. 154(b) by 234 days.

(21) Appl. No.: 12/838,864

(22) Filed: Jul. 19, 2010

(65) Prior Publication Data

US 2012/0015762 A1   Jan. 19, 2012

(51) Int. Cl.
 *B29C 33/42* (2006.01)
(52) U.S. Cl. ........ 264/220; 264/219; 425/175; 425/177; 473/383
(58) Field of Classification Search ............ 264/219, 264/220, 221, 222, 223, 224, 225, 226, 227; 425/175, 176, 177, 178, 179, 180; 473/351, 473/378, 379, 380, 381, 382, 383, 384; D21/708, D21/709
See application file for complete search history.

(56) References Cited

U.S. PATENT DOCUMENTS

| | | | |
|---|---|---|---|
| D30,378 S * | 3/1899 | Foulis | D21/708 |
| D44,408 S * | 7/1913 | Martin | D21/709 |
| 3,831,423 A | 8/1974 | Brown et al. | |
| 4,284,276 A | 8/1981 | Worst | |
| 4,787,638 A * | 11/1988 | Kobayashi | 473/383 |
| 4,830,378 A | 5/1989 | Aoyama | |
| 5,106,096 A | 4/1992 | Dunn | |
| 5,879,245 A | 3/1999 | Hwang | |
| 6,010,442 A * | 1/2000 | Lemons et al. | 473/384 |
| 6,461,253 B2 | 10/2002 | Ogg | |
| 6,547,678 B2 | 4/2003 | Barfield | |
| 6,620,060 B2 | 9/2003 | Ogg et al. | |
| 6,626,772 B1 | 9/2003 | Kennedy, III | |
| 6,632,078 B2 | 10/2003 | Ogg et al. | |
| 6,634,965 B2 | 10/2003 | Yagley et al. | |
| 6,726,869 B2 | 4/2004 | Aoyama et al. | |
| 6,761,846 B2 * | 7/2004 | Murphy | 264/219 |
| 2004/0106477 A1 * | 6/2004 | Ogg | 473/378 |
| 2004/0266559 A1 * | 12/2004 | Asakura | 473/378 |
| 2009/0017941 A1 * | 1/2009 | Sullivan et al. | 473/383 |

FOREIGN PATENT DOCUMENTS

JP    2002369896 A   * 12/2002

OTHER PUBLICATIONS

JPO English machine translation for JP 2002-369896, retrieved Oct. 15, 2012.*

* cited by examiner

*Primary Examiner* — Timothy Kennedy
(74) *Attorney, Agent, or Firm* — D. Michael Burns

(57) ABSTRACT

A method of making a golf ball having a secondary surface texture created on the fret areas by the dimple making procedure. The secondary surface is created on a hob prior to the primary dimple pattern being formed therein, and which largely obliterates the secondary surface texture except for the fret areas and the outer inside surface of the perimeter of the dimples where the depth of the dimple is less than the depth of the secondary surface texture.

16 Claims, 4 Drawing Sheets

METHOD OF CREATING A GOLF BALL WITH A SECONDARY SURFACE TEXTURE FEATURE

FIELD OF THE INVENTION

The present invention relates to golf balls, specifically golf balls having a secondary surface feature or texture formed on the land areas or frets of the ball surface.

BACKGROUND OF THE INVENTION

A golf ball typically includes an outer spherical surface with depressions or dimples on said outer surface. The portions of the outer surface between the dimples are commonly referred to as frets and form the un-dimpled surface of the golf ball. The dimples perturb the air flow surrounding the golf ball and create air turbulence as the ball moves through the air. Turbulence and aerodynamic drag are related by a complicated relationship. The dimples are intended to create the appropriate amount of turbulence to reduce the aerodynamic drag and optimize golf ball performance.

The aerodynamic design of golf balls has historically concentrated on the shape, size, and arrangement of the dimples. In general, little or no attention has been paid to the size and shape of the spaces or frets between the dimples. The natural tendency is to view the golf ball as a 1.68 inch diameter sphere with depressions on the surface.

However, the air flow over the surface does not have such a perceptual bias. The air flow "sees" only a textured surface and has no special regard for whether the texture is provided by a large sphere with depressions in the surface or a smaller sphere with projections on the surface. In fact, the contours of the raised areas between the dimples, i.e., the frets, may have a greater effect of air flow than the shape of the dimples.

If there is an optimal fret width, it is not being exploited on conventional golf balls with dimples having a circular periphery. Circular dimples have a maximal packing efficiency and the spaces between them are not necessarily constant. Further, the cross section of the frets between circular dimples is not rotationally symmetric but changes continuously.

Worst, U.S. Pat. No. 4,284,276, for a Grooved Golf Ball, discloses both grooves and dimples which are distinct surface texture members which have unique locations, however neither a groove nor a dimple is located on top of another member.

Examples of overlapping dimples exist in the prior art, but they are separate surface members of a single pattern or design whose individual members have expanded in size to create an intersection.

Numerous prior art golf balls and references include secondary surface texture features which appear within the primary surface feature. "Dimples within dimples" or various means of creating surface texture inside a spherical dimple or polygon are found. What is desired is to have the secondary surface feature appear predominantly outside the region defined as the primary surface feature, such that a surface texture is created where dimpling is not present.

Kennedy, U.S. Pat. No. 6,626,772, for a "Golf Ball With Elevated Dimple Portions", describes a dimple having an elevated portion such as an annular ring and an edge on only the primary surface texture elements which appear elevated to the ball surface.

An example of using two or more techniques to create additional surface texture is described in Barfield, U.S. Pat. No. 6,547,678, wherein a combination is includes consisting of conventional smooth interior surface spherical dimples and unusually shaped dimples (which include textural elements within them).

The Callaway HX Series golf balls, such as described in U.S. Pat. No. 6,634,965, describe a tubular lattice which comprises the outer diameter of the ball. The surface consists of a well defined series of substantially interconnected line segments located between and defining geometric depressions. The tubular lattice structure replaces the conventional non-dimpled space between dimples. The highest elevations of ridges correspond to the inter-dimple space in a conventional dimple pattern, i.e. the frets. However, these areas do not contain a secondary surface texture as described in the present invention.

Another example of a golf ball having an unusual appearance derived from the proximal location of square and circular dimple types to create the appearance of a geometric protrusion outlining the spherical indentation of dimples is described in U.S. Pat. No. 5,106,096 which relates to a Bullet D.F.S. golf ball. The circular and square cross-section dimples are effectively distinct members of a single surface texture having an unusual inter-dimple geometry. The inter-dimple space does not include a secondary surface texture feature.

Accordingly, it is an object of the present invention, to create a secondary feature intended to appear predominantly in the fret areas of the golf ball surface. This will be a first machining operation prior to cutting the primary surface feature into the master tool, the "hob", used to make the ball molding cavities.

SUMMARY

The objective of the invention is to create secondary surface texture predominantly in the fret areas of a golf ball (land surface between dimples) which to a varying degree extends into the perimeter of the dimples or primary surface texture. This is accomplished in the present invention by a two step process: first, forming a secondary surface texture on the hob; then, creating the primary surface feature which is generally a multitude of indented depressions or dimples. The hob begins with a smooth, generally spherical surface upon which the secondary surface texture is created on portions or the entire surface. A result of creating the primary surface texture on the hob, is that the secondary surface feature is largely obliterated, except within the fret areas and in some dimple areas wherein the depth of the dimple is less than the depth of the secondary surface texture, thus some texture within the perimeter of the dimple. Some examples of secondary patterns that may be used in the golf ball fret areas are: line segments; curves; a grid; a diamond texture pattern; or a bramble pattern consisting of rounded protrusions.

DETAILED DESCRIPTION OF THE INVENTION

Figure 1:
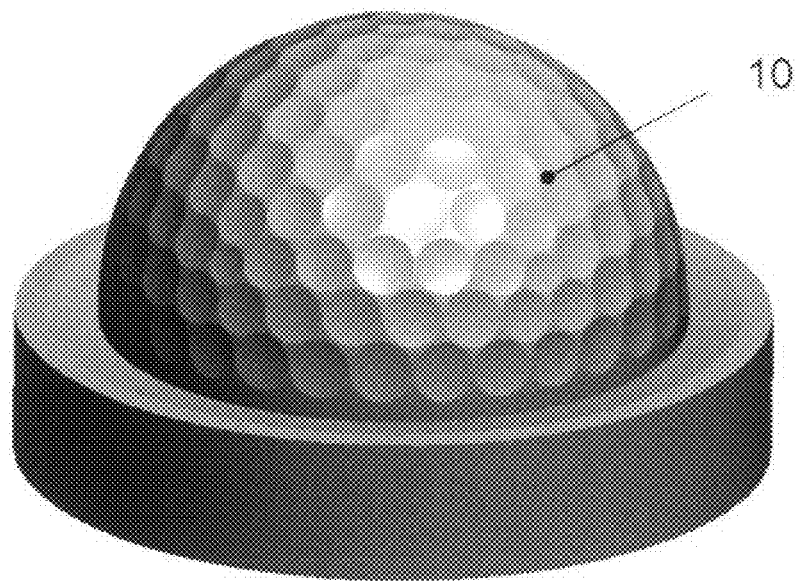
FIG. 1 is a hob as seen in the prior art mirroring a golf ball surface and used in creating a dimpled mold cavity.
Figure 2:
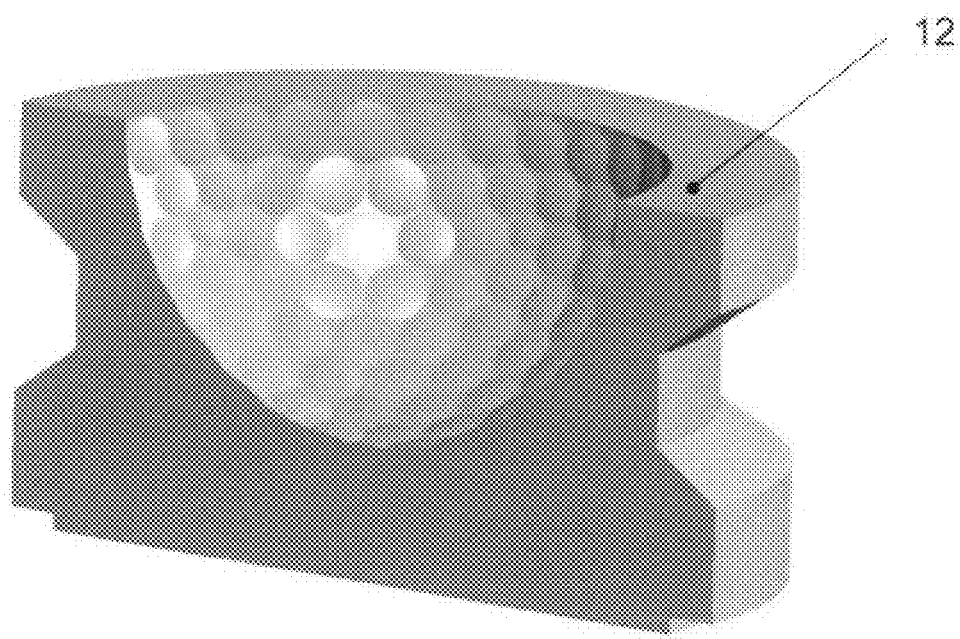
FIG. 2 is a prior art dimpled mold cavity for imparting a dimpled surface to a golf ball cover.

Prior art methods of creating a golf ball cover employ a hob 10, as shown in FIG. 1, wherein the hob is shown having a surface figure which is a "positive" or exact duplicate for the surface of the finished ball. As shown in FIG. 2, the cavity 12 in which the ball cover is formed is therein a "negative" of the cover. To create the cavity, the hob 10 is pressed into a smooth cavity surface which is often called "hobbing". The ordinary sequence of cavity production involves the creation of the hob and the subsequent "pressing or hobbing" of ball cavities to obtain the final dimensions (depth and diameter) of the dimpled surface.

Figure 3A:
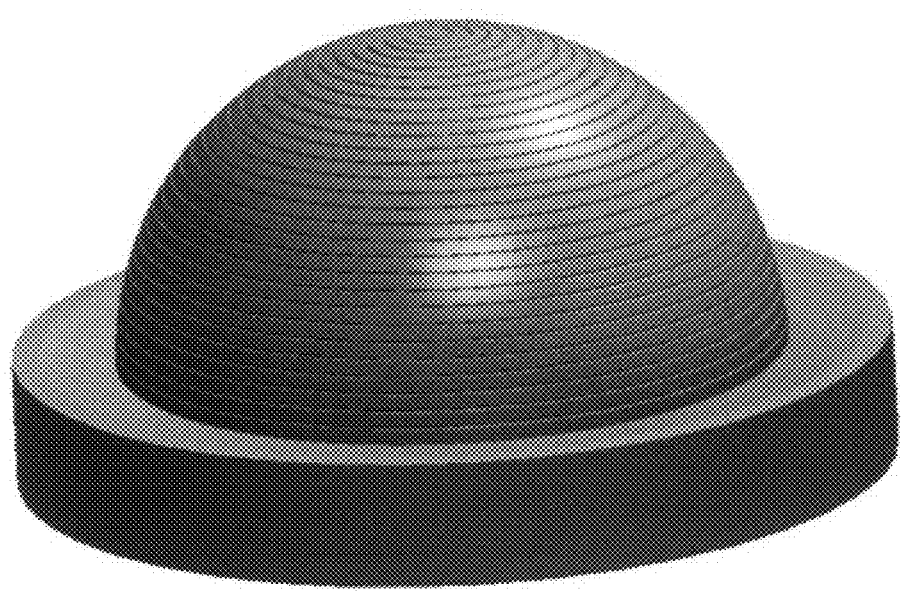
FIG. 3A is the inventive hob as seen after the first machining operation, creating the secondary surface texture.
Figure 3B:
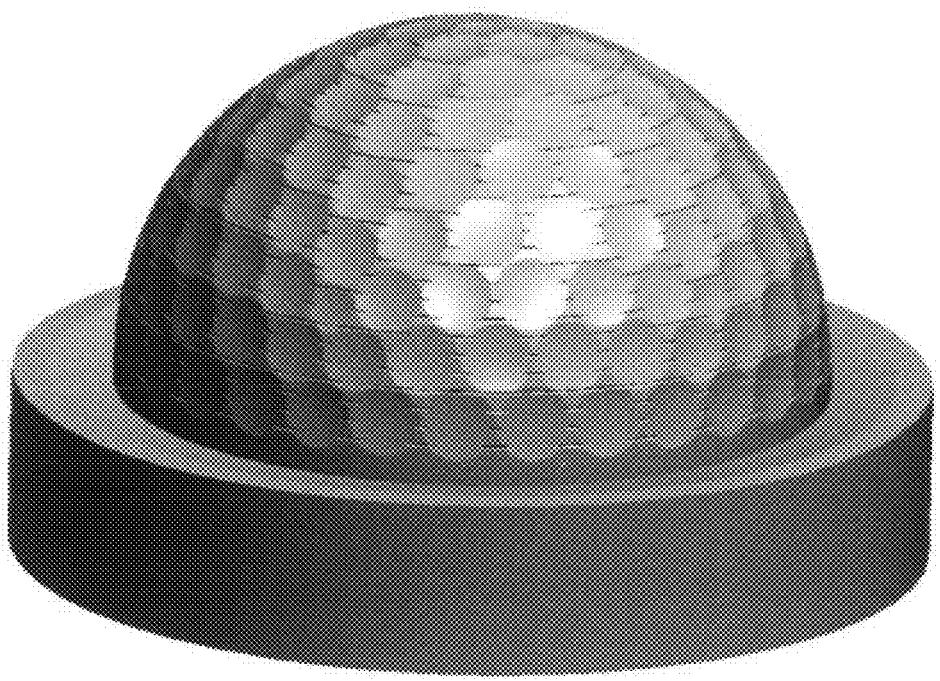
FIG. 3B is the inventive hob as seen after the second machining operation, creating the primary surface texture and used in creating a dimpled mold cavity.
Figure 4:
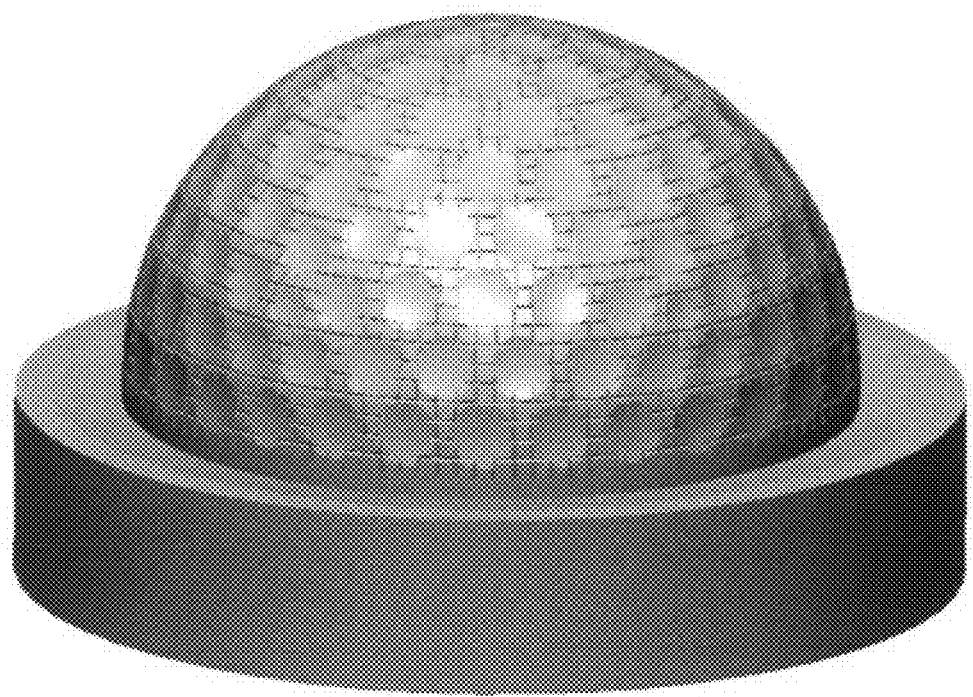
FIG. 4 is a second embodiment hob.
Figure 5:
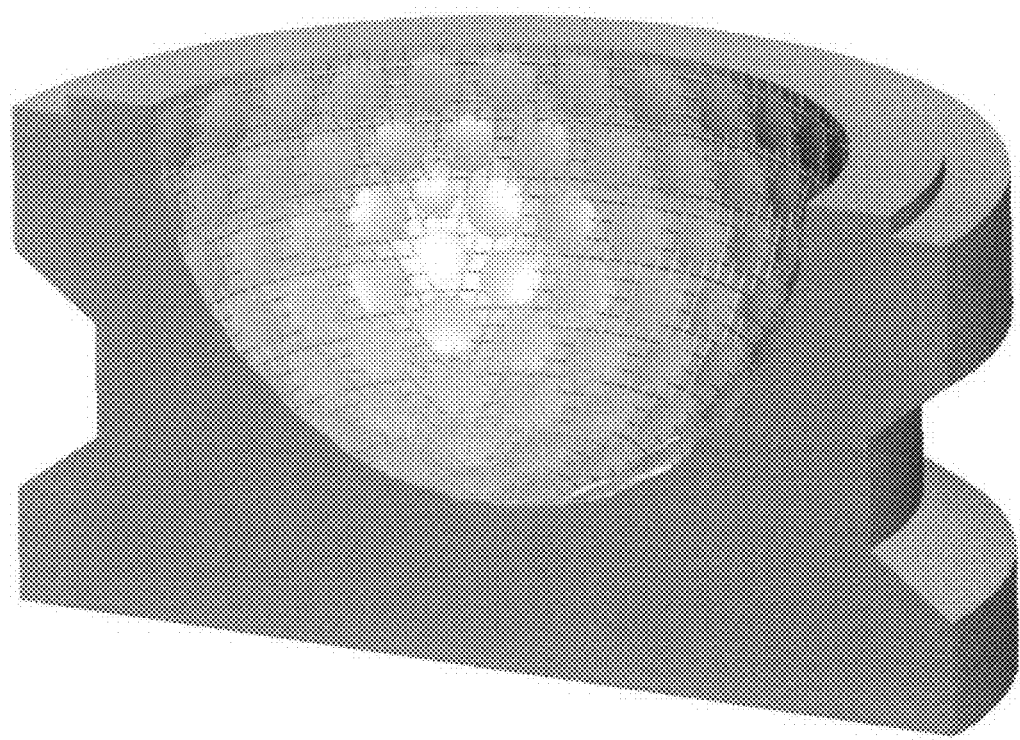
FIG. 5 is a second embodiment mold cavity created for imparting a secondary surface texture to a golf ball cover.

The present invention teaches a method of creating a secondary surface texture on a golf ball cover in the fret areas of the cover (land spaces not occupied by dimples) requiring an initial two-step procedure on a hob, and prior to the hob being used to create a dimpled mold cavity for use in molding golf ball covers. Hob construction begins by creating a smooth hemisphere consisting of the required golf ball dimensions therein resulting in ball cavities of correct size. In the first step, the smooth, hemispherical hob has an initial formation of a secondary surface texture over the entire surface of the hob as shown in FIG. 3A, and this can be done by known CNC machining methods, such as lathing. In the second step, as shown in FIG. 3B, a primary surface feature (usually dimples) is created upon the hob by using methods such as milling or an EDM process, which is when electrical discharge machining is used to create electrical sparks to cut the material. It is understood that any dimple making process will suffice within the present invention. As the dimple forming process is conducted to create the primary surface, the secondary surface texture will be largely obliterated when replaced by the primary surface feature (i.e. dimples). Following the completion of the dimple forming step, the secondary surface feature will primarily remain in the fret space between the dimples. However, in some embodiments as illustrated in FIGS. 3B and 4, the secondary surface texture may extend inside the perimeter of the dimples in areas where the depth of the dimple at that particular area is not as great as the depth of the secondary surface texture. Because dimple designs generally cover at least 60% of the surface of the ball (some in excess of 80%); and others claim to be but in reality shy of 100%, the secondary surface feature will be visible on a smaller portion of the surface of the ball that the primary (i.e. dimpled) surface feature. FIG. 5 illustrates a mold formed by the hob shown in FIG. 4.

Two embodiments of secondary surface textures are shown in FIGS. 3B and 4, however numerous textures could be created without great difficulty. To create the secondary surface textures, the hob may be subjected to a patterning process such as: knurling to create various patterns of generally parallel line segments or curves; a grid or diamond texture pattern may be applied; or a bramble pattern consisting of rounded protrusions could be employed. The secondary texture may appear either as a recess in the smooth spherical surface or as a protrusion. Further there is no limitations on the cross-sectional shape of the secondary texture when viewed normal to the cutting path.

Typically, the secondary surface texture is created as a whole pattern with little consideration for the primary pattern. As stated, a significant portion of the secondary pattern is necessarily obliterated during the second hob production process as in FIGS. 3B and 4. Other embodiments could be used such as a grid of spherical triangles similar to that defined by Aoyama (U.S. Pat. No. 4,830,378) having only a very shallow depth and narrow width is used to create the secondary pattern, then when a primary pattern of 392 spherical dimples (including 5 diameters and about 80% surface coverage) in an icosahedral configuration is cut into the triangulated surface, most of the triangular pattern will be eliminated except for what remains in the inter-dimple space (fret) and that which extends within the perimeter of the primary surface dimple. However, if a primary pattern of 252 dimples (including only one diameter and about 60% surface coverage) is used in the same icosahedral configuration it will create a different appearance in the secondary feature.

It is appreciated that the present invention could have a final golf ball product that includes: a dimple pattern consisting of one or more dimples sizes, shapes, and profiles or any of the prior art primary surface texture features such as polygonal dimples, irregular dimples, "tubular lattice" designs, or combinations of these features; and a secondary surface feature which appears predominantly in the spaces between the dimples.

The present invention employs a first applied (defined as "secondary") surface texture applied to the hob which is largely obliterated by the appearance of a second (defined as "primary") surface texture which has a greater depth to the hob. Once both textures have been applied, the primary texture will dominate the appearance as the secondary texture will be confined to the smaller surface area of the space between the dimples.

Some examples of non-limiting secondary surface features of the present invention are:

- A series of concentric rings parallel to the parting line and extending at intervals beginning from the parting line to the hemispherical apex which form circles of decreasing diameters as they approach the apex;
- A series of arcs parallel to and extending in both directions at intervals from the "half great circle" arc formed by the arc departing at a perpendicular intersection from the parting line, passing through the apex point of the hemisphere, and continuing to meet the parting line again in a second perpendicular intersection displaced from the first by 180° along the great circle that is the parting line;
- Any of the above with variations in the spacing intervals between successive parallel lines or arcs;
- Combinations of the firsts and second example arranged so as to create a grid, cross-hatch or other combination effect;
- Any combination of the above which might incorporate continuous line (arc) segments or discontinuous members such as dotted, dashed or combinations;
- Variations in the depth, width or cross-section are anticipated herein as possible means of modifying the overall symmetry and performance of the resulting product;
- The surface of the hob hemisphere may be subdivided into regions having different secondary features; and
- Many of the ancient surface textures employed before dimple established its dominance could be employed as the secondary surface texture, if they are created at an appropriate depth (usually less than when used as the only surface texture) on the hob. This could lead to a combination "retro" and modern look to the ball.

As previously stated, depending upon the depth of the secondary feature, the secondary feature may appear partially within the perimeter of the primary surface. This is best illustrated by FIGS. 3B and 4. This occurs because the secondary feature is not as deep as the maximum depth of the dimple, however, it is greater than zero. At the edge of the dimple, the dimple edge is zero and according to its geometry diverges from the surface to attain its maximum depth. In the area within the primary feature, where the depth is not as great as the secondary surface feature, the secondary surface feature will extend within the perimeter of the primary surface feature The present invention increases the surface texturing of a golf ball beyond the prior art dimpling methods by incorporating a previously created secondary surface feature. Presumably, any molded article created with a surface texture comprised of distinct elements could have such a secondary surface texture.

We claim:

1. A method of creating a secondary surface texture feature on a golf ball, the method comprising the following steps:
   providing a hob having a smooth surface;
   formulating a secondary surface texture on the surface of the hob by a lathing operation;
   forming a primary surface feature on the hob by an EDM machining operation comprising of a multitude of dimples which substantially obliterate a large portion of the secondary surface texture, leaving the secondary surface texture primarily in the fret areas;
   providing hemispherical mold halves having substantially golf ball dimensional spherical cavity surfaces;
   pressing the hob into the cavity surfaces to produce a ball mold cavity having a surface that is the reverse of the golf ball; and
   forming the golf ball within the mold halves.

2. The method according to claim 1, wherein formulating the secondary surface texture on the hob is by a knurling patterning process to create patterns of parallel line segments or curves.

3. The method according to claim 1, wherein formulating the secondary surface texture on the hob is by a knurling patterning process to create a grid or a diamond texture pattern.

4. The method according to claim 1, wherein formulating the secondary surface texture is creating by a milling process of discontinuous v-shaped grooves.

5. The method according to claim 1, wherein the forming of the secondary surface feature is created by an EDM process.

6. The method according to claim 1, wherein the primary surface of the hob comprises 250 to 450 dimples.

7. The method according to claim 6, wherein the primary surface of the hob comprises 320 to 400 dimples.

8. The method according to claim 1, wherein the primary surface of the hob consists of dimples of varying sizes, shapes and profiles.

9. The method according to claim 8, wherein the varying dimple sizes may comprise any type of primary surface texture shapes such as circular, oval, polygonal, irregular perimeters, or tubular lattice designs or combinations thereof.

10. The method according to claim 8, wherein the varying dimple sizes may comprise any type of primary surface texture profiles such as spherical, catenary, saucer, dimple-in-dimple, constant depth, spherical polygonal, conical, irregular profiles or combinations thereof.

11. The method according to claim 1, wherein the primary surface of the hob consists of dimples arranged according to an icosherdon, octahedron, cuboctahedron, tetrahedron, phyllotaxis or dipyramid pattern.

12. The method according to claim 1, wherein the secondary surface texture comprises a series of concentric rings parallel to a parting line of the ball and extending at intervals from the parting line to the hemispherical apex which forms circles of decreasing diameters as they approach the apex.

13. The method according to claim 1, wherein the secondary surface texture comprises a series of arcs parallel to and extending in both directions at intervals from the half great circle arc formed by the arc departing at a perpendicular intersection from the parting line, passing through the apex point of the hemisphere, and continuing to meet the parting line again in a second perpendicular intersection displaced from the first by 180° along the great circle that is the parting line.

14. The method according to claim 1, wherein the surface of the hob hemisphere is subdivided into regions having different secondary textures.

15. The method according to claim 1, wherein the secondary surface texture extends into the perimeter of the primary surface feature in an area within the dimple where the depth of the dimple cavity is less than the depth of the secondary surface feature.

16. The method according to claim 1, wherein the secondary surface texture extends into the perimeter of the primary surface feature by no more than 30% of the largest dimple perimeter dimension.

* * * * *